UNITED STATES PATENT OFFICE.

CHARLES DREYFUS AND ARTHUR FRIEDL, OF MANCHESTER, AND WILLIAM HENRY BENTLEY, OF IRLAM, ENGLAND, ASSIGNORS TO CLAYTON ANILINE COMPANY LIMITED, OF CLAYTON, NEAR MANCHESTER, ENGLAND.

MANUFACTURE OR PURIFICATION OF INDIA-RUBBER AND THE LIKE AND THE OBTAINMENT OF BY-PRODUCTS THEREFROM.

983,812.  Specification of Letters Patent.  Patented Feb. 7, 1911.

No Drawing.  Application filed March 19, 1910.  Serial No. 550,494.

*To all whom it may concern:*

Be it known that we, CHARLES DREYFUS, ARTHUR FRIEDL, Ph. D., and WILLIAM HENRY BENTLEY, subjects of the King of Great Britain and Ireland, of Claremont, Fallowfield, Manchester, 1 Woodlands, Victoria Park, Manchester, and 6 Woodbine Terrace, Irlam, respectively, all in the county of Lancaster, England, have invented new and useful Improvements in the Manufacture or Purification of India-Rubber and the Like and the Obtainment of By-Products Therefrom, of which the following is a specification.

Our invention relates to the treatment of raw, or washed, products containing india-rubber, balata, or the like, for the purpose of obtaining such indiarubber, balata, or the like, free from resin, or resinous matter, and obtaining the resin, or resinous matter, as by-products.

According to this invention, the raw material, and especially such as has not hitherto been capable of being properly purified by washing, is, either directly, or after the first cleaning, and, if necessary after comminution, treated with pyridin, or a pyridin base, under such conditions as regards temperature that the resin, or resinous matter, is dissolved, but the rubber, or the like, is not dissolved, or injured in any way. We have found that under such conditions the resin, or resinous matter, will be extracted without dissolving, or injuring, the indiarubber, or the like. This result was not to be foreseen, because hitherto pyridin and pyridin bases have been proposed only as solvents of indiarubber, balata, and the like, in the preparation of solutions thereof (see the specification of British Letters Patent No. 6471 of 1904). The facts that pyridin and pyridin bases are cheap and have a wide range of boiling points, so that any particular fraction can be selected to suit the especial character of the raw material to be treated, and the nature of the resin, or resinous matter, contained therein, are important advantages in carrying out our invention.

The invention is not limited to the use of the pyridin, or pyridin base, alone, as it may, if desired, be applied in admixture with any ordinary, or suitable, resin solvents which will not injuriously act on the rubber, or the like, at the temperature employed, such, for example, as alcohol and acetone, and the claims are to be understood to cover the use of pyridin, or pyridin base, whether used alone, or in conjunction with such ordinary, or suitable, resin solvents.

The extraction of the resin, or resinous matter, can be carried out as follows, but we do not limit ourselves to these examples.

Example 1: Raw rubber (washed, or unwashed,) containing resin, or resinous matter, such, for example, as pontianak, almeidina, euphorbia, and flakes, or the like, is (if necessary in a comminuted condition) mixed with about six times its weight of a pyridin base, boiling between 130° and 220° centigrade, and with its own weight of water. This mixture is agitated and heated to about 100° centigrade with a reflux condenser for from two, to four, hours. After extraction of the resin, or resinous matter, the rubber is separated, and the resin, or resinous matter, can be removed from the solvent by distilling off the solvent, either by direct heat, or by steam. The high boiling pyridin oil fraction can also be recovered by extraction with dilute sulfuric acid.

Example 2: A quantity of one of the poor quality rubber, or like, gums of commerce is treated with from five, to six, times its weight of a pyridin base (without the addition of water, such gums containing already a large amount of water) for from two, to four, hours in a water bath, so that the temperature does not exceed 100° centigrade.

For the dry rubber, or like, gums, such as the Madagascar gums, and the like, from five, to six, parts of pyridin base are used and the treatment can be effected with, or without, water, the temperature being kept under 120° centigrade.

The time occupied in the treatment will depend upon the temperature employed, the lower the temperature the longer being the time required for the treatment. For example, in the treatment of the low quality gums, if the temperature employed be as low as normal atmospheric temperature, or but little above it, the time occupied by the treatment will be as much as from twenty, to thirty, hours. In all cases, at the temperature employed, the resin, or resinous matter, is dissolved, but the rubber, or the like, is not dissolved, or injured in any way. The explanation of this apparently paradoxical behavior of the pyridin and pyridin bases is that the raw, highly resinous rubbers of commerce contain considerable quantities of water with which the pyridin bases combine to form hydrates which, while still serving to dissolve the resins, have on the other hand not only lost their property of dissolving rubber but actually serve as precipitants therefor.

Variations of the process which do not depart from our invention will readily suggest themselves, and we do not limit ourselves to the precise procedure or proportions stated.

What we claim is:—

1. The process of extracting resins or resinous matter from products containing india rubber, balata, or the like, which consists in subjecting the latter to the action of pyridin at a suitable temperature and in the presence of a rubber precipitant, substantially as and for the purpose described.

2. The process of extracting resins or resinous matter from products containing india rubber, balata, or the like, which consists in subjecting the latter to the action of pyridin at a temperature not materially exceeding 120° C., and in the presence of a rubber precipitant, substantially as and for the purpose described.

3. The process of extracting resins or resinous matter from products containing india rubber, balata, or the like, which consists in subjecting the latter to the action of a suitable solvent such as pyridin at a suitable temperature and in the presence of a substance which prevents the rubber from dissolving under the conditions of the reaction.

In testimony whereof we have signed our names to this specification in the presence of two subscribing witnesses.

CHARLES DREYFUS.
ARTHUR FRIEDL.
WILLIAM HENRY BENTLEY.

Witnesses:
ERNALD SIMPSON MOSELEY,
GEORGE WEAVER.